Jan. 5, 1954
J. W. GREIG
2,664,596
PANEL MOLDING AND ASSEMBLY THEREOF
Filed May 27, 1949
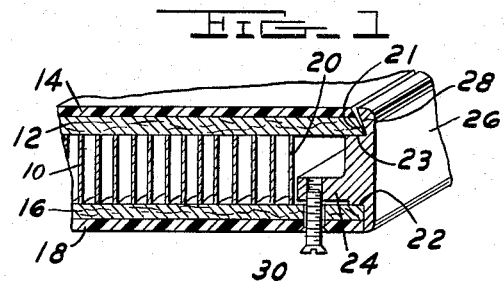
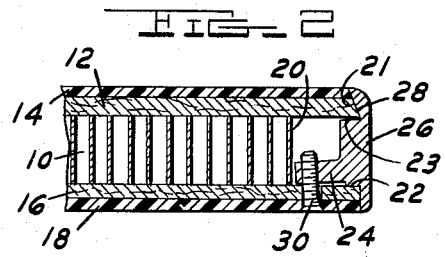
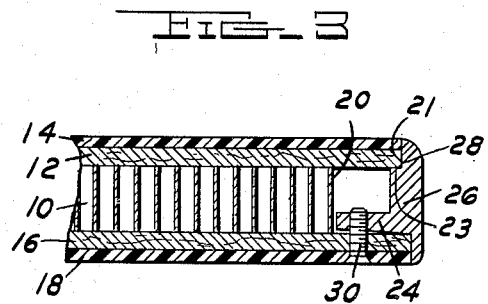
INVENTOR.
James W. Greig
BY
Burton & Parker
ATTORNEYS Patented Jan. 5, 1954

2,664,596

UNITED STATES PATENT OFFICE 2,664,596

PANEL MOLDING AND ASSEMBLY THEREOF

James W. Greig, Detroit, Mich., assignor to Woodall Industries, Inc., Detroit, Mich., a corporation of Michigan Application May 27, 1949, Serial No. 95,790

4 Claims. (Cl. 20—15)

This invention relates to improvements in panel moldings and panel and molding assemblies.

Heretofore panels such as table tops, desk tops, shelf panels or the like, have been provided with marginal finish moldings of one kind or another. One conventional type of finish molding was channel shaped in cross-section and fitted over the margin of the panel. It was secured to the panel by screw fasteners extending through the bottom of the channel and into the interior of the panel. Another conventional type of molding was T-shaped in cross-section. The upright leg of the T was received within a groove or kerf extending into and along the margin of the panel. This upright leg of the T was generally serrated or toothed to engage the side walls of the groove within the panel. Such panels were formed of sheet material having an interior structure adapted to be securely engaged by the fastening means of the molding. If the panel were formed of laminated sheet material the core ply possessed substantial fastener retaining strength.

An object of this invention is to provide an improved molding for a panel, the interior structure of which possesses little or no fastener retaining strength. A purpose is to provide a molding for a composition laminated panel sheet wherein the core ply of the sheet is formed of inexpensive fibrous material of low density and little, if any, fastener retaining strength but wherein the two outer plies possess substantially greater fastener retaining strength. Attachment of a finish molding to such a panel sheet presents difficulty. It would not be possible to securely attach either of the two conventional types of molding, above referred to, to such a panel in the manner hereinabove described because the core ply would not retain the molding fastening means. My molding and panel assembly is of such a character that the molding can not only be securely attached to such a panel but the molding is tensioned against the margin of the panel so as to prevent the development of a crack or opening between the molding and panel margin.

A further object is to provide an improved molding for the margin of a panel such as a table top, desk top, door panel or the like which molding presents an attractive appearance, protects the panel margin from accidental injury, grips the panel margin so as to prevent splitting or delamination of the panel and reinforces the panel structurally.

My improved molding is angular in cross-section. Specifically it is generally T-shaped in cross-section but with the upright leg of the T offset laterally toward one end of the horizontal leg or one end of the head of the T. This upright leg of the T is received within the margin of the panel. Preferably the panel is formed to exhibit a channel or kerf extending within and along the margin of the panel. The head of the T extends along over the margin of the panel and overlies the margins of the side walls of this channel. The upright leg of the T-shape is so secured to one side wall of the channel within which it is received that the head of the T is tensioned against an edge of a side wall of the channel to maintain a tight joint therewith.

In a preferred construction the upright leg of the T-shaped molding which is received within the margin of the panel is connected with one side wall of the channel within which it is received so that the head of the T-shaped molding is tensioned against the edge of the other side wall of the channel. The edge of the other side wall of the channel and the cooperating abutting face of the molding are preferably so shaped that the molding not only forms a tight joint therewith but holds such side wall against spreading.

Other objects, advantages and meritorious features of this invention will more fully appear from the following description, claims and accompanying drawing, wherein:

Fig. 1 illustrates an enlarged perspective of a fragment of a panel partly in section embodying the invention and illustrating an intermediate step in the securement of the molding to the margin of the panel;

Fig. 2 is an enlarged section through a fragment of the panel shown in Fig. 1 illustrating the completion of the securement of the molding to the margin of the panel; and Fig. 3 is an enlarged section through a panel showing a modification of the invention.

A molding of the type here illustrated is adapted to be secured to the margin of any suitable panel sheet but it is particularly useful in connection with laminated panel sheets wherein the core ply is of a relatively low density material such as corrugated paper or a honeycomb type of fibrous paper structure and wherein the two outer protective surface plies are formed of material of substantially higher density such as Masonite or the like.

In the several figures of the drawing a three ply panel is shown. The core ply is indicated as 10. It is illustrated as formed of a corrugated or honeycomb type of paper stock of light weight and low density. It might be formed of any suitable material. Both outer surface plies are formed of relatively dense material.

The upper outer surface ply is here specifically shown as consisting of a foundation lamination 12 provided with a finish lamination 14. The foundation lamination may be a sheet of dense fibrous composition material such as Masonite. The finish coating lamination 14 may be of resin or resin impregnated paper adhesively secured to the foundation lamination 12. The fact that the top layer is here illustrated as a laminated one is not intended to indicate that such a structure is necessary to the carrying out of the invention. Any suitable protective surface lamination might be employed.

The bottom surface ply is likewise here illustrated as consisting of a foundation lamination 16 provided with a finish surface lamination 18. The construction of this bottom ply is shown as similar to that of the upper ply.

The two surface plies may be secured to the core ply by any suitable adhesive so as to form an integral structure. The core ply here shown as formed of corrugated paper stock presents the edges of the paper strips which make up the ply perpendicularly to the upper and lower surface plies so that a structure of substantial strength as to compressibility and load carrying capacity is provided.

The core ply terminates spaced from the outer margins of the upper and lower surface plies whereby the margin of the panel exhibits a channel 20 which extends lengthwise of the margin of the panel. Such channel includes a pair of side walls being the upper and lower surface plies of the panel. The margin of one side wall is beveled inwardly of the panel and toward the outer face thereof as at 21.

I provide a finish molding for the margin of the panel. Such molding is generally angular in cross-section. More specifically it is generally T-shaped in cross-section. The upright leg of the T is offset toward one end of the head or horizontal leg of the T. This upright leg of the T is indicated by the numeral 24. It is received within and extends along through the channel 20.

The head of the T indicated by the numeral 26 extends along over the margin of the panel overlying the edges of the side walls of the channel and closing the mouth of the channel. The molding shown in Figs. 1 and 2 is so shaped as to provide a pair of shoulders 22 and 23 which are received within the mouth of the channel and abut the opposed inner surfaces of the side walls thereof. In the preferred form of construction shown in Figs. 1 and 2, the top margin of the head 26 of the T is undercut as at 28 to engage the beveled outer edge 21 of the top side wall of the channel. When so engaged therewith such side wall is held inwardly against any tendency toward outward spreading or delamination from the core.

Securing means in the form of screws 30 or the like are provided. Such a screw is shown as extending through the lower side wall of the channel, which is material of high retentiveness for a fastener, and into the upright leg 24 of the molding. Such connection exerts a tension on the molding holding such leg toward the adjacent side wall of the channel. In the preferred construction shown in Figs. 1 and 2 the leg 24 is so shaped that it is normally spaced slightly by the thickness of the shoulder portion 22 above the adjacent side wall of the channel.

When the screw 30 is tightened down it tends to tilt the molding and exerts a tension which holds the head of the T against the edge of the opposite side wall of the channel. In the construction shown in Figs. 1 and 2 this results in the holding of the beveled edges 21 and 23 tightly together. This prevents any tendency toward separation of such beveled edges and any tendency toward delamination of the top layer of the panel. This is a feature of importance in connection with table tops and other similar panel structures where it is desired that the top of the table exhibit an unbroken surface.

In Fig. 3 the shoulder 22 is omitted and the leg 24 is tapered and rests adjacent its base against the adjacent side wall of the channel. Tensioning of this leg 24 against the adjacent side wall of the channel by the screws 30 also produces a tilting action of the molding and holds the head of the T molding against the edge of the opposite side wall of the channel.

What I claim is:

1. In combination with a three ply panel having a core ply of relatively low density disposed between an outer top ply and an outer bottom ply, each outer ply being of relatively high density, a moulding extending along over the margin of the panel, said moulding being generally T-shaped in cross section and having its upright leg projecting into the margin of the panel between the top and bottom plies thereof and having its head extending along over the margin overlying the edges of the top and the bottom plies and closing the space therebetween, said moulding provided with a portion on the underside of the head at the base of the leg bearing against the bottom ply of the panel supporting that portion of the leg adjacent to the margin thereof spaced from the bottom ply of the panel, and fastening means securing the leg of the moulding adjacent to its margin to the bottom ply of the panel drawing the leg toward said bottom ply and tilting the head of the moulding to bear against the edge of the top ply of the panel.

2. A three ply moulding as defined in claim numbered 1 characterized in that the upright leg of the moulding is offset from the linear center line of the head toward that margin of the head which is disposed adjacent to the bottom ply of the panel and the head of the moulding is provided on its underside adjacent to the leg with a shoulder which abuts the bottom ply of the panel and spaces the remainder of the leg therefrom and that portion of the underside of the head which overlies the edge of the top ply of the panel is undercut on a bevel.

3. A combination of a three ply panel having a core ply formed of low density material possessing relatively low fastener retentiveness and having a top ply and a bottom ply each formed of relatively high density material, the bottom ply possessing relatively high fastener retentiveness, a moulding generally T-shaped in cross section extending along over the margin of the panel with the upright leg of the T-shape disposed between the top and the bottom plies of the panel and with the head of the T-shape overlying the edges of the top and the bottom plies and securing the plies therebetween, said moulding having a pair of shoulders formed on the underside of the head projecting inwardly of the margin of the panel abutting the top and the bottom plies thereof spacing said plies apart, the leg of the T-shape being spaced from the bottom ply of the panel, fastening means holding said leg adjacent its edge toward the bottom ply of the panel and tilting the head of the moulding and holding it toward the edge of the top ply of the panel.

4. In combination with a three ply panel having a core ply of relatively low density material of low fastener retentiveness disposed between an outer top ply and an outer bottom ply, the outer bottom ply being of relatively high density material possessing relatively high fastener retentiveness, a moulding generally T-shaped in cross section extending along and over the margin of the panel with the upright leg of the T-shape disposed within the interior of the margin of the panel between the top and the bottom plies thereof and with the head of the T-shape overlying the edges of the top and the bottom plies of the panel and closing the space therebetween, the leg of the T-shape which is disposed between the top and the bottom plies of the panel being tapered from the head toward the margin of the leg, that portion of the leg adjacent to the head bearing against the bottom ply of the panel and normally spacing the margin of the leg from said bottom ply, and securing means connecting that portion of the leg adjacent to its margin with the bottom ply of the panel holding said leg toward said ply and tilting the head of the moulding toward the edge of the top ply of the panel.

JAMES W. GREIG.

References Cited in the file of this patent

UNITED STATES PATENTS

| Number | Name | Date |
|---|---|---|
| 1,343,168 | Young | June 8, 1920 |
| 1,910,144 | Bales | May 23, 1933 |
| 1,911,779 | Uhl | May 30, 1933 |
| 1,930,345 | Lewis | Oct. 10, 1933 |
| 2,159,300 | Tashjian | May 23, 1939 |
| 2,298,578 | Madsen | Oct. 13, 1942 |
| 2,361,733 | Bartholomew | Oct. 31, 1944 |
| 2,417,435 | Munters | Mar. 18, 1947 |

FOREIGN PATENTS

| Number | Country | Date |
|---|---|---|
| 392,470 | Great Britain | of 1933 |
| 315,616 | Italy | of 1934 |
| 52,972 | Denmark | of 1937 |